United States Patent [19]
Willson et al.

[11] Patent Number: 5,234,328
[45] Date of Patent: Aug. 10, 1993

[54] RETRIEVAL SYSTEM FOR REMOVING ARTICLES FORMED BY A MANUFACTURING APPARATUS

[75] Inventors: Bryan D. Willson; David E. Carson, both of Fort Collins; Curtis D. Guinn, Longmont, all of Colo.

[73] Assignee: CBW Automation, Inc., Fort Collins, Colo.

[21] Appl. No.: 785,432

[22] Filed: Oct. 29, 1991

[51] Int. Cl.⁵ .............................................. B29C 45/40
[52] U.S. Cl. .................................. 425/139; 264/334; 425/444; 425/556
[58] Field of Search ............... 425/139, 554, 556, 437, 425/441, 443, 444; 264/334, 335

[56] References Cited

U.S. PATENT DOCUMENTS

| | | | |
|---|---|---|---|
| 3,709,379 | 1/1973 | Kaufeldt | 214/1 BB |
| 3,820,667 | 6/1974 | Critchlow et al. | 214/1 BT |
| 3,921,820 | 11/1975 | Crockett | 214/1 BB |
| 3,949,620 | 4/1976 | Zehender | 74/225 |
| 4,561,825 | 12/1985 | Sakata | 414/753 |
| 4,588,370 | 5/1986 | Ichizawa et al. | 425/556 |
| 4,717,310 | 1/1988 | Heindel et al. | 414/753 |
| 4,770,598 | 9/1988 | Kotani | 414/752 |
| 4,781,571 | 11/1988 | Heindl et al. | 425/556 |
| 4,795,124 | 1/1989 | Nagai | 425/556 |
| 4,968,214 | 11/1990 | Shiotami | 414/751 |
| 5,114,327 | 5/1992 | Williamson et al. | 425/556 |

FOREIGN PATENT DOCUMENTS 0380177  8/1990  European Pat. Off. .

*Primary Examiner*—Tim Heitbrink
*Attorney, Agent, or Firm*—William E. Hein

[57] ABSTRACT

A retrieval system for rapidly removing articles from a plastic molding machine or other manufacturing process includes a pair of lightweight carbon fiber tubes arranged for telescoping motion into and out of an open mold. The telescoping tubes are driven by a low inertial cable drive system. A high volume, low pressure vacuum is supplied to the telescoping tubes and, in turn, to a set of receivers mounted on the pair of telescoping tubes to rapidly draw molded articles from the mold as they are conventionally ejected therefrom. A differential vacuum sensing system provides confirmation that all of the molded articles have been drawn from the mold by the receivers. Withdrawal of the pair of telescoping tubes, with the molded articles just retrieved, from the open mold is then initiated simultaneously with initiation of closure of the mold in preparation for a new molding cycle.

17 Claims, 9 Drawing Sheets

RETRIEVAL SYSTEM FOR REMOVING ARTICLES FORMED BY A MANUFACTURING APPARATUS

BACKGROUND AND SUMMARY OF THE INVENTION

This invention relates generally to article handling apparatus and more specifically to an apparatus for rapidly removing molded articles from plastic molding machines, as well as articles formed by various other manufacturing processes. A number of systems are known in the prior art for removing molded articles following ejection of those parts from a conventional injection molding machine, for example. Included are simple systems in which molded articles are permitted to drop from the mold after ejection, labor intensive manual systems, conveyor systems that transport the articles after they have been ejected, and more complex mechanical grasping and suction systems that serve to remove the ejected articles. The prior art manual systems result in contamination of dropped articles and the need for additional subsequent handling. The prior art mechanical grasping and suction systems are disadvantageous in that they suffer from slow operating speeds. In today's manufacturing processes, it is important to increase the output of manufactured articles to control the cost of production and thereby maintain a competitive position in the marketplace. This need for high output is particularly important in the plastic molding industry, for example, where molding cycles may be no more than a few seconds. The production rate in this industry has been limited by the inability of prior art article handling devices to rapidly retrieve molded parts from a mold so that a new molding cycle may begin.

It is therefore a principal object of the present invention to provide a retrieval system for rapidly removing articles from a plastic molding machine or other manufacturing process to significantly shorten the manufacturing cycle time over prior art manufacturing processes that employ automated article retrieval systems. The speed advantage afforded by the present invention is achieved by realizing acceleration rates on the order of 22 G's as compared to acceleration rates in prior art direct drive robot systems of typically 5.7 G's. This and other objects are accomplished in accordance with the illustrated preferred embodiment of the present invention by providing a pair of lightweight non-metallic telescoping tubes arranged for telescoping motion into and out of an open mold. The telescoping tubes are driven by a low inertia cable drive system. A high volume vacuum is supplied to the telescoping tubes and, in turn, to a set of receivers mounted on the telescoping tubes to rapidly draw molded articles from the mold as they are conventionally ejected therefrom. A differential vacuum sensing system provides confirmation that all of the molded articles have been drawn from the mold by the receivers. The telescoping non-metallic tubes, with the molded articles just retrieved, may then be instantaneously withdrawn from the open mold to permit early closing of the mold so that a new molding cycle may be initiated.

DETAILED DESCRIPTION OF THE INVENTION

Referring generally to FIGS. 1-6, there is shown an article retrieval system 100 positioned in relationship to a conventional molding machine 110 such that molded articles 114 are automatically rapidly removed from a mold 112 controlled by molding machine 110 at the completion of each molding cycle. The articles 114 so removed may then be oriented and routed for further processing, as desired, by an apparatus illustrated generally in FIG. 1 that does not form part of the present invention. While the preferred embodiment of article retrieval system 100 is described herein as cooperatively connected to a plastic molding machine, it has applicability in a number of article manufacturing processes, such as those involving aluminum forming and paper cup forming, for example.

Figure 1:
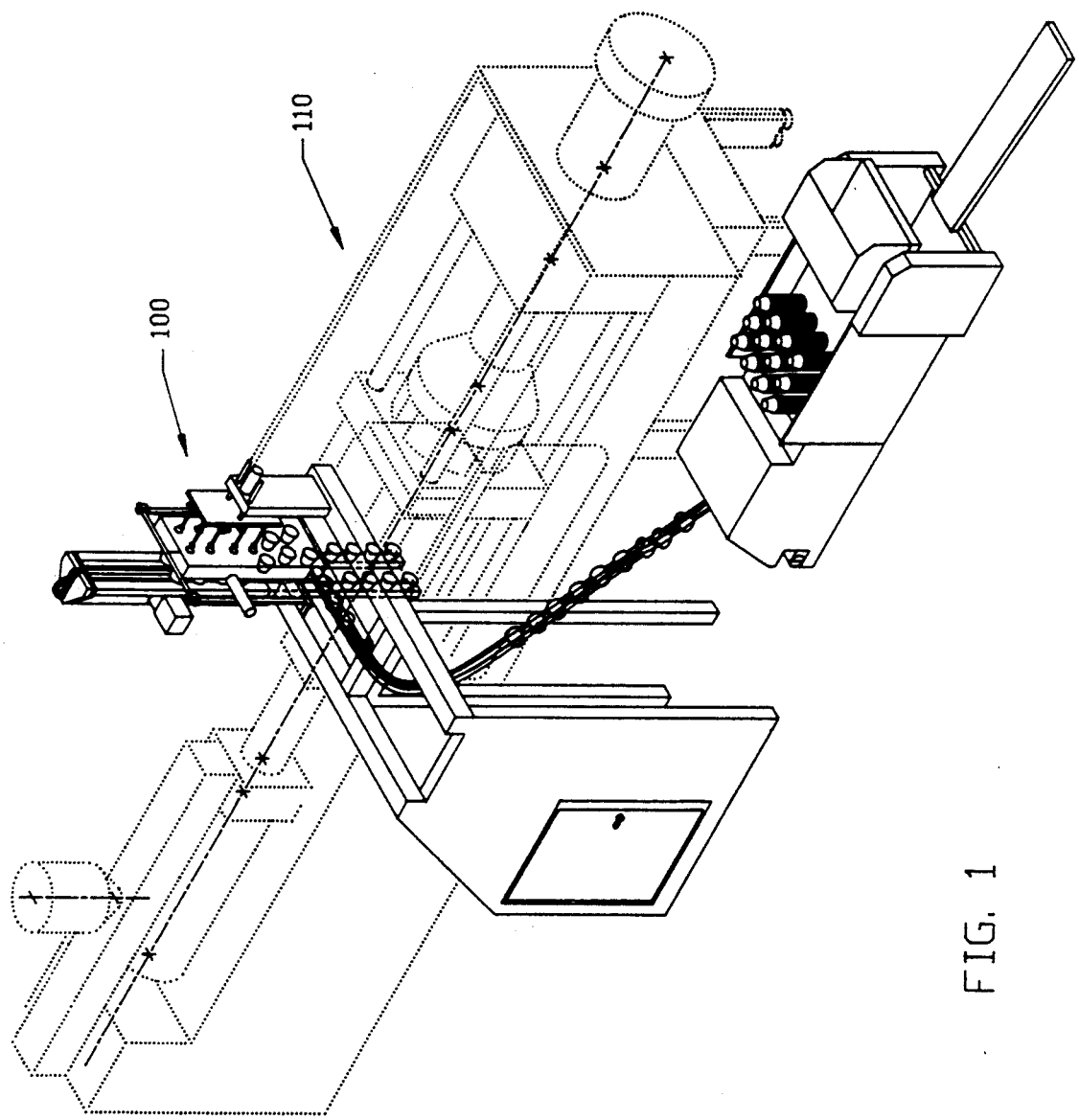
FIG. 1 is an overall pictorial diagram illustrating the article retrieval system of the present invention positioned for removing molded parts from a conventional molding machine.
Figure 2:
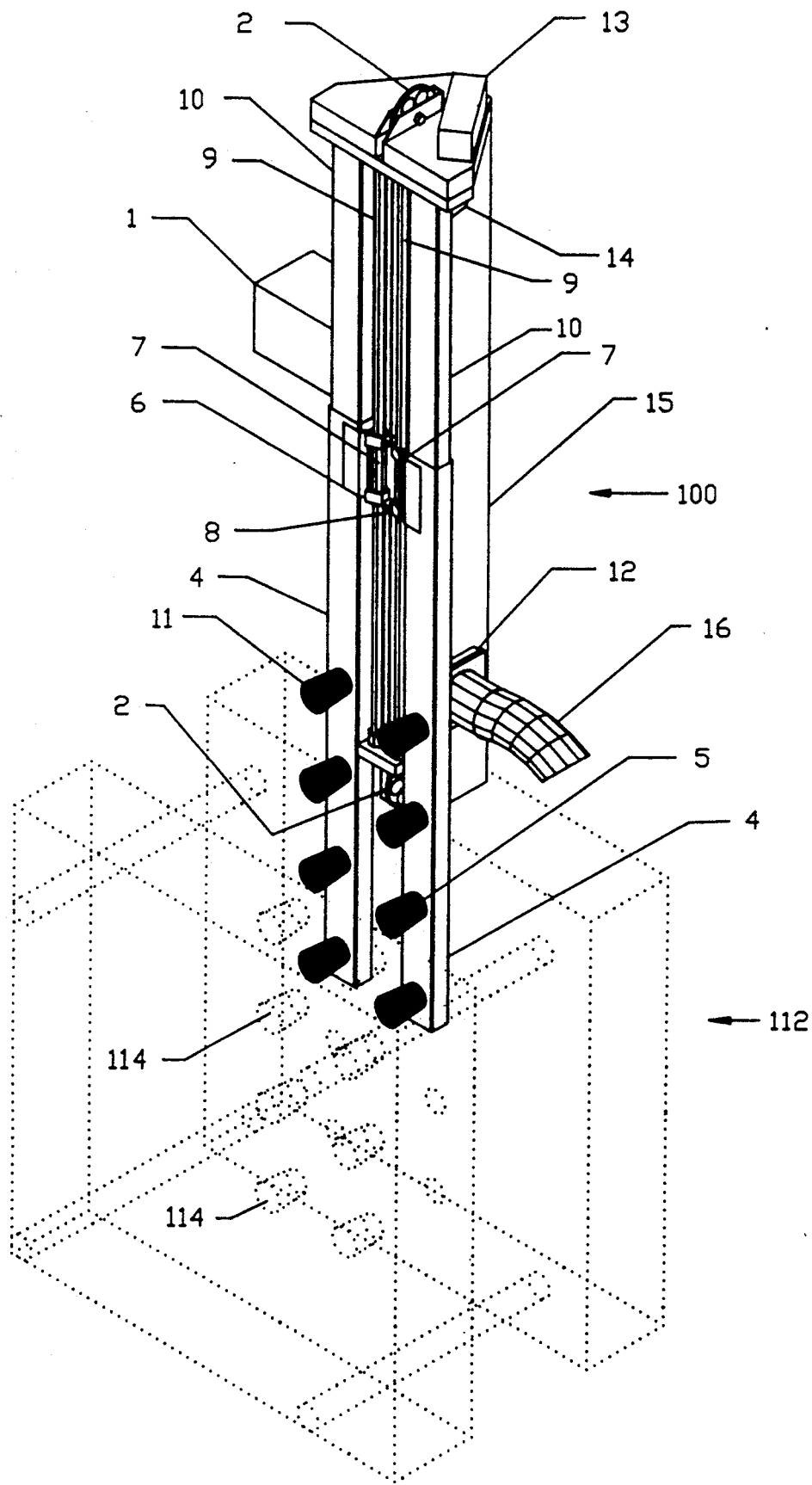
FIG. 2 is a more detailed pictorial diagram illustrating the positioning of the article retrieval system of FIG. 1 with respect to an open mold.
Figure 3:
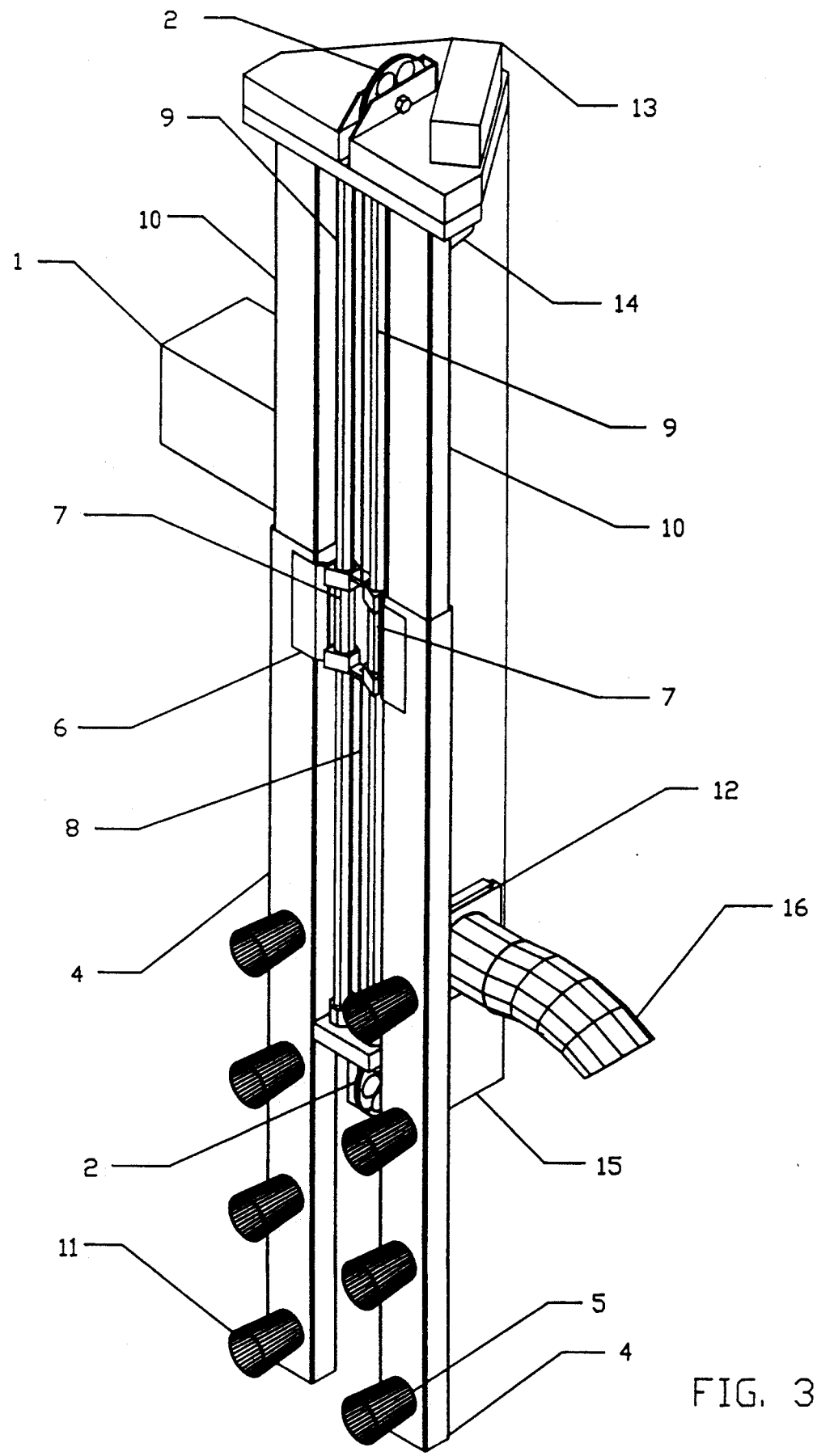
FIG. 3 is a detailed pictorial diagram of the article retrieval system of FIGS. 1 and 2.
Figure 4:
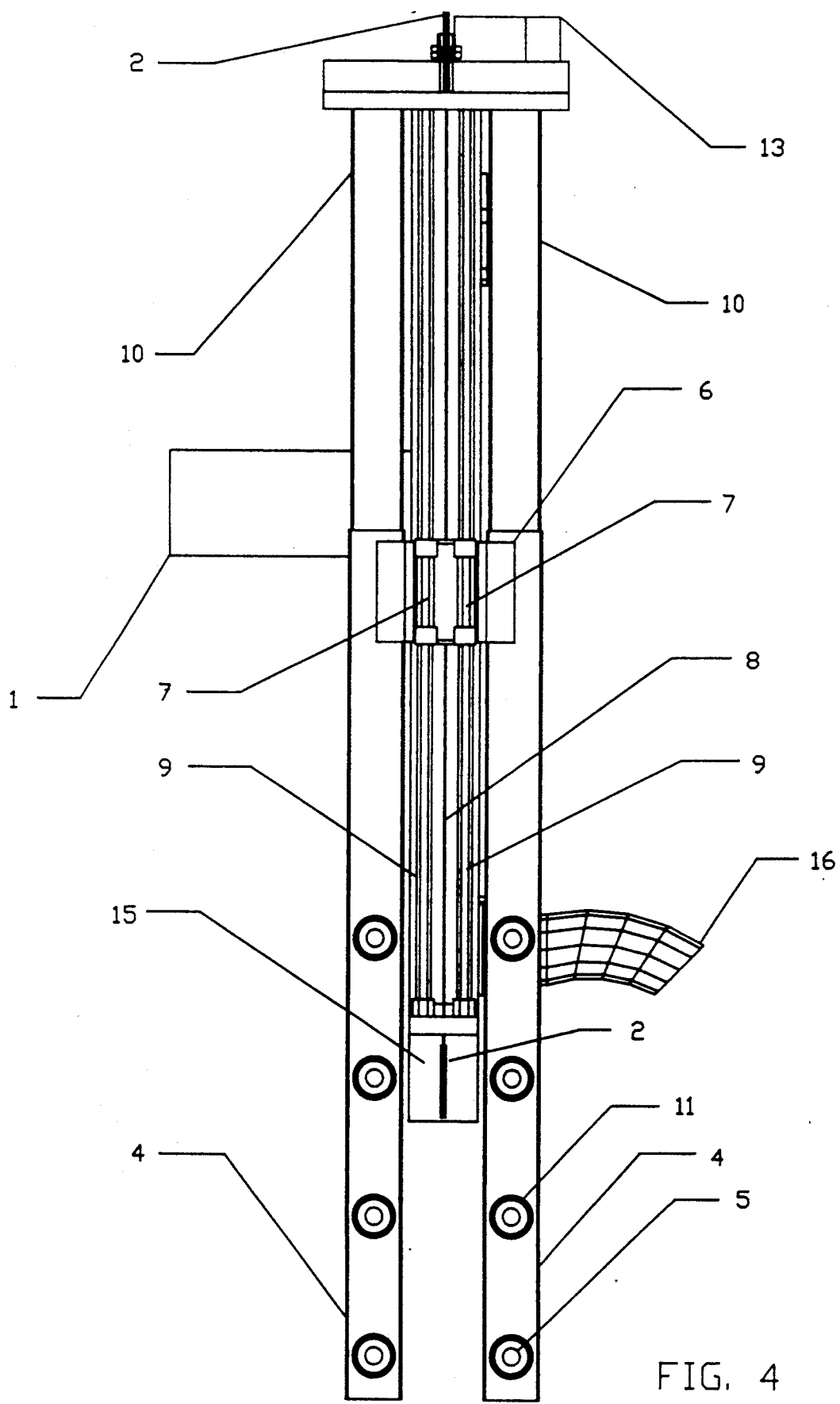
FIG. 4 is a front view of the article retrieval system of FIGS. 1-3.
Figure 5:
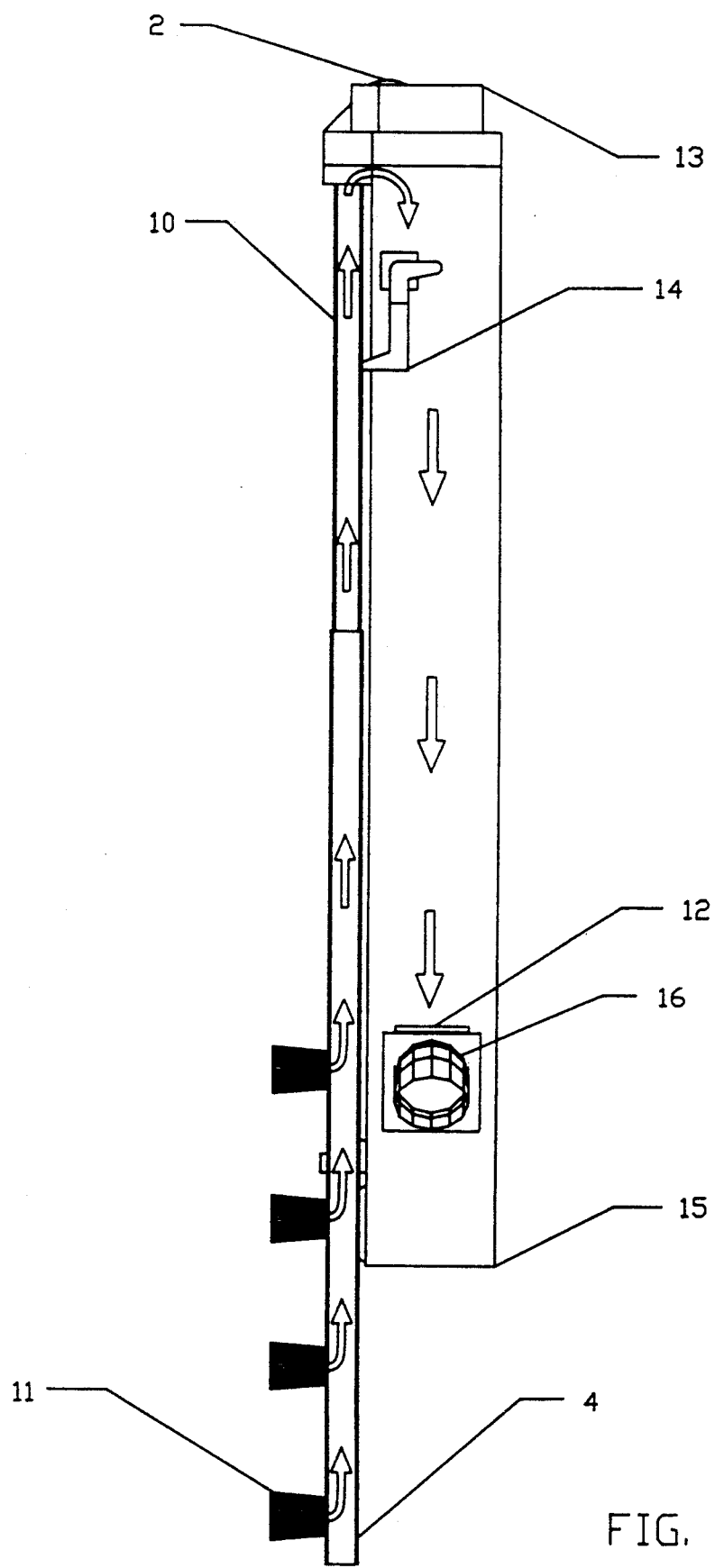
FIG. 5 is a side view of the article retrieval system of FIGS. 1-4 illustrating vacuum flow through a plurality of receivers and within the telescoping tubes and support beam of the system.

Referring more specifically to the detailed diagrams of FIGS. 2-6, article retrieval system 100 includes a pair of vertically positioned, parallel non-metallic tubes 4 mounted to a tube carrier 6 that is coupled through a set of bearings 7 to a pair of vertical parallel guide shafts 9. Non-metallic tubes 4 may be constructed of any of a number of materials, such as carbon fiber materials or various plastic materials, for example. In the illustrated preferred embodiment, non-metallic tubes 4 comprise carbon fiber tubes. Tube carrier 6 and non-metallic tubes 4, connected thereto, are driven upward and downward, between predetermined top and bottom positions, on guide shafts 9 by a cable system that generally comprises a servo motor 1, two idler pulleys 2, a drive pulley 3, and a drive cable 8, illustrated in the detailed diagram of FIG. 6 and described below. Non-metallic tubes 4 are arranged in telescoping relationship with respect to respective fixed tube guides 10 at the top of article retrieval system 100. Non-metallic tubes 4 have the advantages over conventional metallic components of a significant weight reduction and of preventing damage to mold 112 in the event of a system failure that results in mold 112 closing on non-metallic tubes 4. A number of receivers 11 are mounted on non-metallic tubes 4 in correspondence with the positions of the molded articles as they are ejected from mold 112. A vacuum valve 12, mounted on a stationary support beam 15 of article retrieval system 100 receives vacuum from a conventional external source through a vacuum tube 16. A high volume vacuum flow of at least 100 cfm is preferred. Vacuum flows through the stationary support beam 15, fixed tube guides 10, and non-metallic tubes 4, as illustrated in FIG. 5. Vacuum ports 5 at each of the receivers 11 serve to draw molded articles 114 from mold 112. Receivers 11 may be formed in any desired shape. For example, they may be cup-shaped or they may be generally flat with a flange along at least a portion of a peripheral edge to provide support for molded articles 114 as they are retrieved from mold 112. Preferably, each of the receivers 11 is formed to be of the same shape as a projecting portion of corresponding ones of molded articles 114 so that a substantial projecting portion of each one of molded articles 114 fits snugly within its associated one of receivers 11. A vacuum sensor 13, described in more detail below, serves to sense the vacuum level of the article retrieval system 100 to confirm that each of the receivers 11 has drawn a molded part 114 from mold 112. A safety kicker 14, mounted on stationary support beam 15, operates to prevent non-metallic tubes 4 from dropping downward in the event of a failure of the cable system that drives non-metallic tubes 4.

Figure 7:
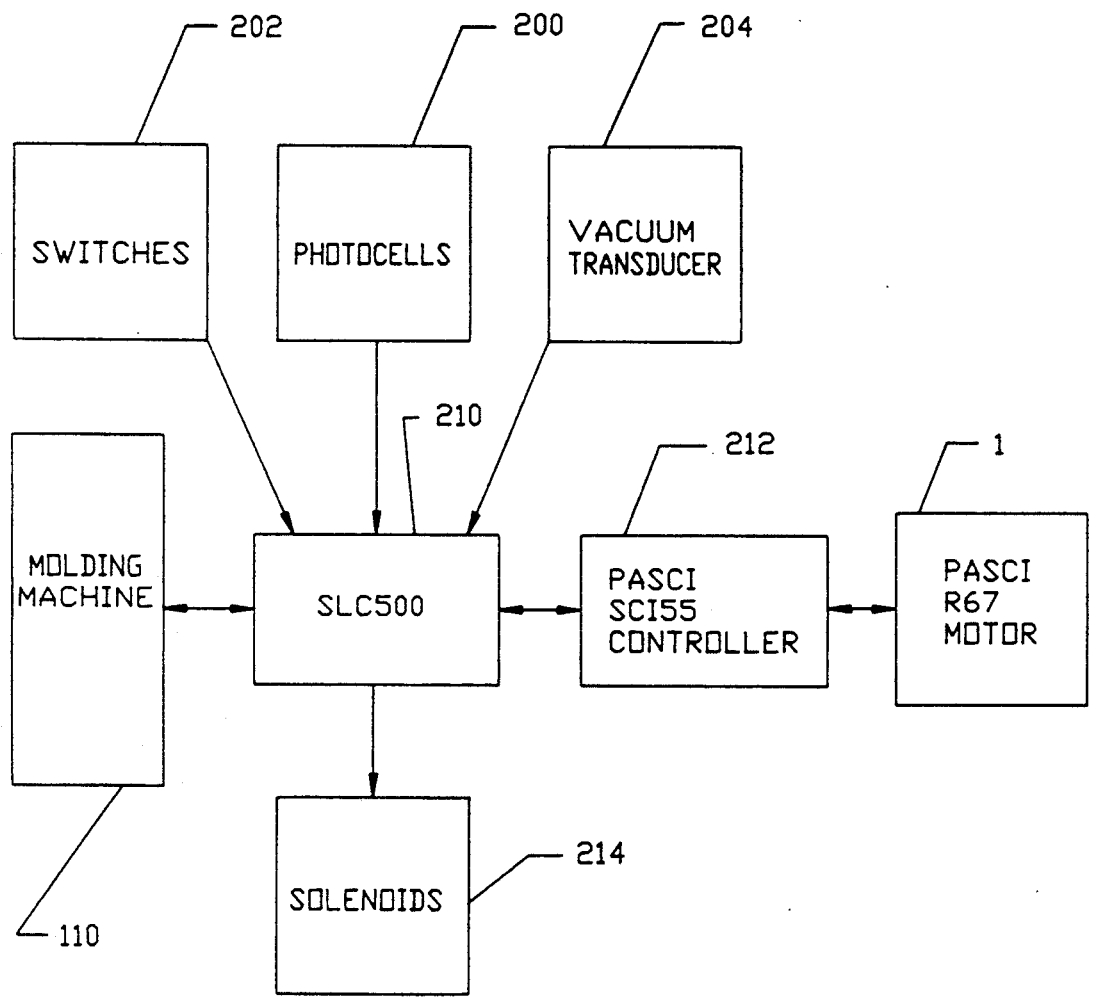
FIG. 7 is an electrical block diagram illustrating the way in which various elements of the article retrieval system of FIGS. 1-5 are coupled for control of the system.

Referring now to FIG. 7, there is shown a block diagram of a controller portion of the article retrieval system 100. A microprocessor based controller 210 receives inputs from a number of devices and generally controls operation of the article retrieval system 100. Controller 210 may comprise any of a number of off-the-shelf controllers such as the Allen Bradley SLC500 controller. Controller 210 accepts +20-volt D.C. signals from the various input devices, and includes relay and triac output contacts that signal or supply power to the various output devices it controls. Controller 210 performs the routines shown in the flow charts of FIGS. 8 and 9 and is programmed with those routines by way of a conventional handheld programmer or a personal computer employing conventional software for that purpose. Inputs to controller 210 are scanned and outputs are updated in response to the scanned inputs in ten milliseconds or less.

A motor controller 212, which may comprise a Pacific Scientific SC155 controller, for example, is conventionally interfaced to controller 210 to control the operation of servo motor 1 to drive tube carrier 6 and non-metallic tubes 4 upward and downward. Motor controller 212 receives signals from controller 210, during a startup procedure, to allow motor controller 212 to set a home position of servo motor 1. Following completion of the startup procedure, motor controller 212 receives move and return signals from controller 210 to initiate or halt operation of servo motor 1. Motor controller 212 is programmed in a conventional version of BASIC computer language to transmit control signals to servo motor 1 and to receive feedback signals therefrom to properly position tube carrier 6 and non-metallic tubes 4 at either the top or bottom positions of their vertical range of travel. Motor controller 212 also receives emergency stop signals from controller 210 in response to various sensed emergency conditions to immediately halt operation of servo motor 1.

Figure 6:
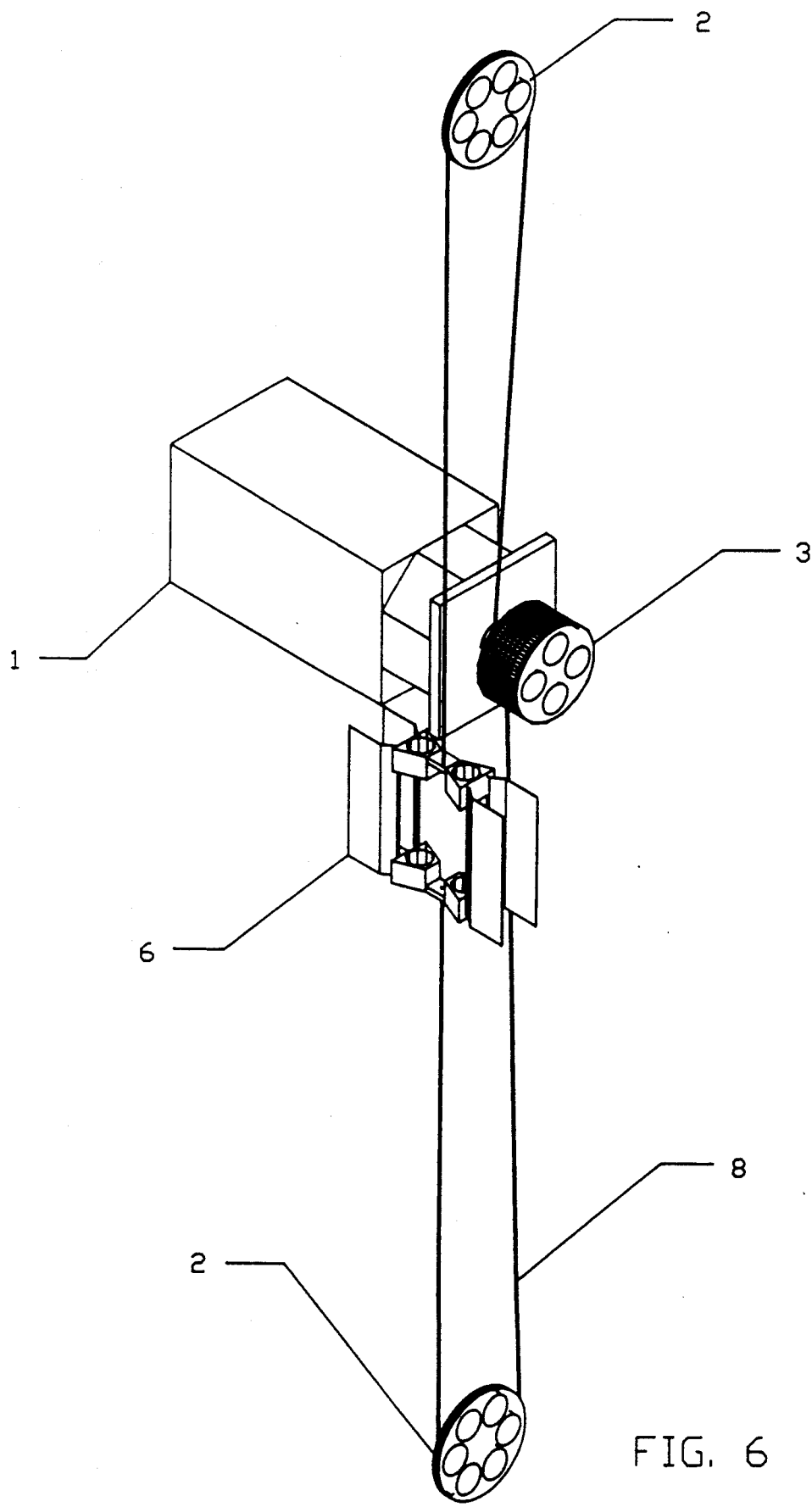
FIG. 6 is a schematic pictorial diagram illustrating the cable drive mechanism employed in the article retrieval system of FIGS. 1-5.

As stated above, servo motor 1 initiates motion of the cable system illustrated in detail in FIG. 6 to drive tube carrier 6 and non-metallic tubes 4 upward and downward between top and bottom positions. Servo motor 1 may comprise, for example, a Pacific Scientific R67 servo motor that will move an index increment in 150 milliseconds. Servo motor 1 continuously provides feedback signals to motor controller 212 that are indicative of the current position of its shaft to enable motor controller 212 to adjust the voltage supplied to servo motor 1 to insure its desired precise positioning.

Molding machine 110 is also interfaced to controller 210 such that various signals are transmitted therebetween. For example, controller 210, in response to inputs received from various ones of the photocells 200, signals molding machine 110 to activate a conventional air eject system on mold 112 and to close mold 112 when non-metallic tubes 4 have been raised above mold 112 at the end of an article retrieval cycle. Controller 210 also receives signals from molding machine 110 indicative of closure of a safety gate and of actuation of an emergency stop switch on molding machine 110.

A plurality of photocells 200 are conventionally positioned on tube carrier 6 to detect various positions of non-metallic tubes 4, such as a home or top position, a bottom position, an air blast position, an overtravel position, a mold closed position, and a mold open position. Additional ones of the plurality of photocells 200 function as proximity sensors and are positioned on molding machine 110 to detect a mold closed position and a mold open position.

A plurality of manually-operated switches 202 are conventionally provided to effect manual control of certain desired functions, including mode selection, air solenoid operation, reset, and the application of operating power to the article retrieval system 100.

A vacuum transducer 204 is located on the top of support beam 15 to sense the vacuum level within the article retrieval system 100 and to provide a continuous analog indication of the vacuum level to controller 210. Controller 210 records this indication and computes an average indication that is used to set current high and low vacuum setpoints for each molding cycle. At the time during an article retrieval cycle that non-metallic tubes 4 reach the bottom of their range of vertical travel, controller 210 delays sending a return signal to motor controller 212 until the vacuum level sensed by vacuum transducer 204 is within the current high and low vacuum setpoints. A sensed vacuum level that falls within the current high and low vacuum setpoints indicates that all molded parts have been suctioned onto receivers 11 and that tube carrier 6 and non-metallic tubes 4 are ready to be returned to the top of their range of vertical travel. This function guarantees that upward motion of tube carrier 6 and non-metallic tubes 4 is not initiated before all molded articles 114 have been retrieved from mold 112. If a sensed vacuum level within the predetermined limits is not received from vacuum transducer 204 by controller 210 within a certain time, a reset switch of switches 202 must be manually actuated to return the tube carrier 6 and non-metallic tubes 4 to the top of their range of vertical travel.

A pair of conventional air solenoids 214 are powered by controller 210 to control safety kicker 14 to hold tube carrier 6 and non-metallic tubes 4 in their top position when operating power to the article retrieval system 100 is removed and to operate vacuum valve 12. When operating power is applied to the article retrieval system 100 and servo motor 1 is enabled, the one of air solenoids 1 that controls safety kicker 14 is turned on by controller 210 to insure that safety kicker 14 is disengaged to permit normal motion of tube carrier 6 and non-metallic tubes 4. When operating power is removed from the article retrieval system 100 or the air pressure supplied to air solenoids 214 drops below a minimum operating level, as sensed by a pressure switch, this air solenoid will be turned off, thereby engaging safety kicker 14 to hold tube carrier 6 and non-metallic tubes 4 in their top position. The other one of air solenoids 214 controls vacuum valve 12 to apply vacuum for retrieval of molded articles 114 from mold 112 by receivers 11 and to remove vacuum for release of molded articles 114 from receivers 11 after they have been retrieved from mold 112 and the tube carrier 6 and non-metallic tubes 4 have been moved to their top position.

The article retrieval system 100 is initialized prior to first being placed into operation. During the initialization process, operating power is applied and non-metallic tubes 4 are moved to their top position. An initial vacuum level provided by vacuum transducer 204 is manually stored at a memory location in controller 210. Non-metallic tubes 4 are then moved to their bottom position and receivers 11 are each manually engaged with one of the articles 114 to be retrieved. The analog signal signal produced by vacuum transducer 204 is again manually recorded. One of the articles 114 is then removed from a selected one of the receivers 11, and the analog signal produced by vacuum transducer 204 is again manually recorded. Typical levels of vacuum sensed by vacuum transducer 204 are the equivalent of seven inches of water when each of the receivers 11 is engaged with one of the articles 114 and 6.75 inches of water when just one of the receivers 11 is empty. Using the information obtained by this initialization process, preset values of high and low vacuum setpoints are entered into the memory of controller 210. These preset values of high and low vacuum levels are used during operation of the article retrieval system to sense engagement of one of articles 114 with each of the receivers 11. Sensing the absence of just one of a plurality of articles 114, as provided in the present invention, is more complex than simply sensing the absence of the single article retrieved in single received retrieval systems of the prior art.

Figure 8:
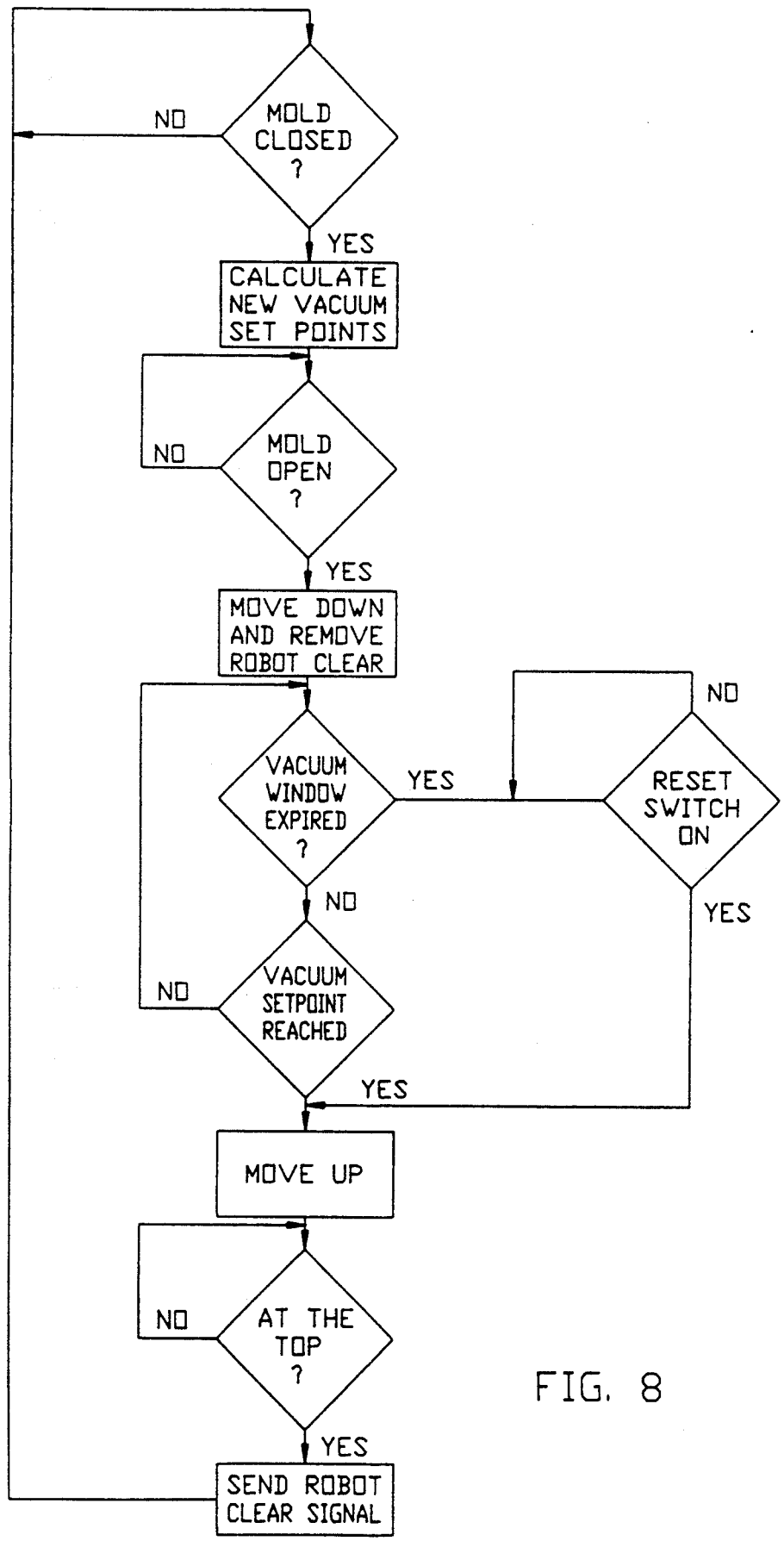
FIG. 8 is an overall flow chart of routines performed by the controller of FIG. 7 during a molding cycle.
Figure 9:
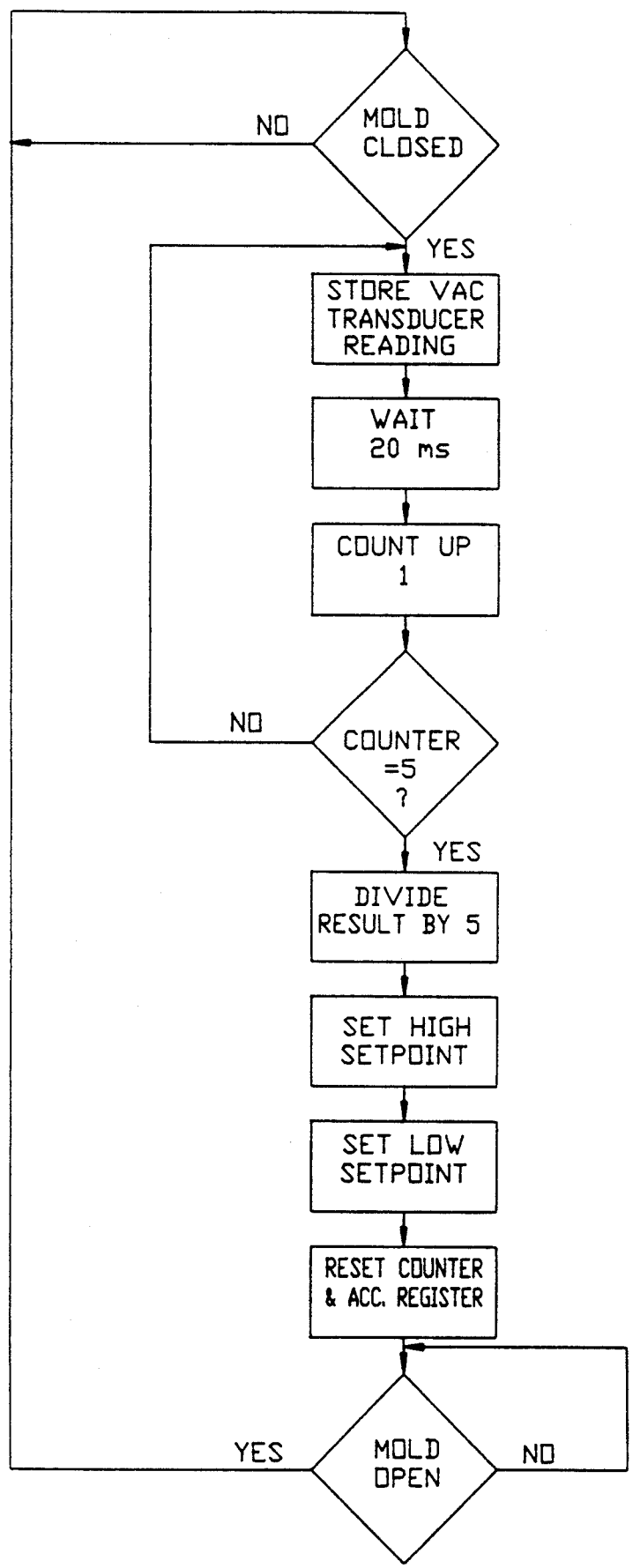
FIG. 9 is a detailed flow chart of the way in which new vacuum setpoints are calculated in accordance with the flow chart of FIG. 8.

In normal operation, controller 210 performs the routines set forth in FIGS. 8 and 9 to control operation of the article retrieval system 100 during an article retrieval cycle. During the time that mold 112 is closed, five vacuum samples, 20 milliseconds apart, as provided at the output of vacuum transducer 204, are taken by controller 210. Controller 210 averages these samples and stores the result. The result is compared with the initial vacuum level previously stored in controller 210. The result is subtracted from the initial vacuum level to obtain an offset. The offset is applied to the preset high and low vacuum setpoints, obtained during the initialization procedure described above, to compute current high and low vacuum setpoints, which are then stored in controller 210. When mold 112 begins to open to permit removal of molded articles 114, the appropriate ones of photocells 200 generate a mold open signal that is supplied to controller 210. Because of the positioning of these photocells, the mold open signal initiates downward motion of tube carrier 6 and non-metallic tubes 4 in advance of the point in time at which mold 112 is in its fully open position, thereby minimizing the time required to complete an article retrieval cycle. By the time that mold 112 is in its fully open position, tube carrier 6 and non-metallic tubes 4 are at their bottom position. A vacuum transducer time window is then initiated. During this time window, controller 210 continuously monitors the vacuum level sensed by vacuum transducer 204. When controller 210 determines that the vacuum level sensed by vacuum transducer 204 falls within preset limits, a second time window is initiated, during which molded articles 114 are suctioned onto receivers 11. At the end of this time window, controller 210 signals motor controller 212 to activate servo motor 1 to return tube carrier 6 and non-metallic tubes 4 to their top or home position. In the event that controller 210 determines, during the vacuum transducer time window, that the vacuum level sensed by vacuum transducer 204 does not fall within the preset limits, thereby indicating that at least one of the molded articles 114 has not been suctioned onto its associated one of receivers 11, upward movement of the tube carrier 6 and non-metallic tubes 4 is inhibited until the appropriate one of manual switches 202 is actuated. At the same time that upward motion of tube carrier 6 and non-metallic tubes 4 is initiated, a clear signal is supplied to molding machine 100 by controller 210, thereby simultaneously initiating closure of mold 112 and the beginning of a new molding cycle, including the computation of current high and low vacuum setpoints by controller 210. If tube carrier 6 and non-metallic tubes 4 do not reach their top or home position within 200 milliseconds from the time that their upward motion is initiated, the clear signal will be removed to halt closure of mold 112. This signalling sequence significantly increases the overall speed of the article retrieval system of the present invention.

We claim:

1. An article retrieval device for removing a plurality of articles formed by a manufacturing apparatus upon ejection therefrom, the article retrieval device comprising:
   a support beam positioned adjacent said manufacturing apparatus;
   a pair of parallel fixed tubes attached to said support beam;
   cable drive means, coupled to said support beam, said cable drive means including a pair of parallel tube shafts and a tube carrier arranged to be driven along said tube shafts in a linear path, said cable drive means being operative for driving said tube carrier between first and second stop positions;
   a pair of parallel non-metallic tubes, fixedly coupled to said tube carrier, and positioned in telescoping arrangement with said pair of fixed tubes, said pair of non-metallic tubes being operative for linear motion in concert with said tube carrier between said first and second stop positions;
   a plurality of receivers, mounted on said pair of non-metallic tubes, said plurality of receivers being positioned to be proximate the locations of said plurality of formed articles as they are ejected from said manufacturing apparatus when said tube carrier is in said second stop position and to be clear of said manufacturing apparatus when said tube carrier is in said first stop position;
   external vacuum means, coupled to said support beam, for drawing a vacuum through said support beam, said pair of fixed tubes, sad pair of non-metallic tubes, and said plurality of receivers;
   controller means, coupled to said cable drive means and to said manufacturing apparatus, for causing said cable drive means to move said pair of non-metallic tubes from said first stop position to said second stop position as said plurality of formed articles is being ejected from said manufacturing apparatus; said controller means further comprising vacuum control and differential vacuum sensing means for controlling said vacuum means to cause the application of vacuum at said plurality of receivers to thereby suction each one of said plurality of ejected formed articles into retained engagement with respective ones of said receivers and for sensing the suctioned engagement of said plurality of formed articles with said corresponding plurality of receivers; said controller means being operative for then causing said cable drive means to move said pair of non-metallic tubes from said second stop position to said first stop position and to then remove vacuum from said receivers, thereby releasing said plurality of articles from retained engagement with said plurality of receivers.

2. An article retrieval device as in claim 1 wherein:
said tube carrier and non-metallic tubes move in a vertical direction and;
said cable drive means comprises first and second idler pulleys positioned adjacent top and bottom ends of said support beam, a drive pulley, a stepper motor coupled to said drive pulley, and a drive cable, one end of which is connected to a top end of said tube carrier and the other end of which is connected to a bottom end of said tube carrier, the drive cable being routed over said first and second idler pulleys and being wound around said drive pulley.

3. An article retrieval device as in claim 2 further comprising safety latch means positioned at the top of said support beam for retaining said pair of non-metallic tubes in said first stop position, in the event of a loss of operating power, to prevent inadvertent gravitational downward motion thereof; said controller means being operative for releasably controlling said safety latch means during normal operation of said article retrieval device.

4. An article retrieval device as in claim 1 wherein said non-metallic tubes are fabricated of a carbon fiber material.

5. An article retrieval device as in claim 1 wherein each one of said plurality of receivers is formed to be of the same shape as a projecting portion of a corresponding one of said plurality of formed articles.

6. An article retrieval device as in claim 1 wherein each one of said plurality of receivers is formed to be cup-like.

7. An article retrieval device as in claim 1 wherein each one of said plurality of receivers comprises a generally flat plate having a flange along a portion of a peripheral edge thereof.

8. An article retrieval device as in claim 1 wherein said vacuum control and differential vacuum sensing mean comprises:
a vacuum transducer for sensing a current vacuum level drawn through said plurality of receivers;
vacuum sampling means for recording the current vacuum level sensed by said vacuum transducer at a plurality of predetermined intervals during a time when said non-metallic tubes are in said first stop position, for computing an average current vacuum level, and for computing current high and low vacuum setpoints, said vacuum sampling means being further operative for continuously monitoring said current vacuum level during a time window when said non-metallic tubes are in said second stop position; and
vacuum comparison means for comparing said current vacuum level, during the time window when said non-metallic tubes are in said seconds top position, with said computed current high and low vacuum setpoints to determine whether all of said plurality of formed articles are in suctioned engagement with said corresponding plurality of receivers, said controller means inhibiting said cable drive means to prevent movement of said non-metallic tubes from said second stop position to said first stop position when said current vacuum level is not within said computed current high and low vacuum setpoints.

9. An article retrieval device for removing a plurality of articles formed by a plastic molding machine upon ejection therefrom, the article retrieval device comprising:
a support beam positioned adjacent said plastic molding machine;
a pair of parallel fixed tubes attached to said support beam;
cable drive means, coupled to said support beam, said cable drive means including a pair of parallel tube shafts and a tube carrier arranged to be driven along said tube shafts in a linear path, said cable drive means being operative for driving said tube carrier between first and second stop positions;
a pair of parallel non-metallic tubes, fixedly coupled to said tube carrier, and positioned in telescoping arrangement with said pair of fixed tubes, said pair of non-metallic tubes being operative for linear motion in concert with said tube carrier between said first and second stop positions;
a plurality of receivers, mounted on said pair of non-metallic tubes, said plurality of receivers being positioned to be proximate the locations of said plurality of formed articles as they are ejected from said plastic molding machine when said tube carrier is in said second stop position and to be clear of said plastic molding machine when said tube carrier is in said first stop position;
external vacuum means, coupled to said support beam, for drawing a vacuum through said support beam, said pair of fixed tubes, said pair of non-metallic tubes, and said plurality of receivers;
controller means, coupled to said cable drive means and to said plastic molding machine, for causing said cable drive means to move said pair of non-metallic tubes from said first stop position to said second stop position, in response to a mold open signal produced by said plastic molding machine indicating that a mold contained within said plastic molding machine is being opened to eject said plurality of formed articles therefrom; said controller means further comprising vacuum control and differential vacuum sensing means for controlling said vacuum means to cause the application of vacuum at said plurality of receivers to thereby suction each one of said plurality of ejected formed articles into retained engagement with respective ones of said receiver cups and for sensing the suction engagement of said plurality of formed articles with said corresponding plurality of receivers; said controller means being operative for then issuing a mold close signal to said plastic molding machine to initiate close of said mold, for simultaneously causing said cable drive means to move said pair of non-metallic tubes from said second stop position to said first stop position, and for then removing vacuum from said receivers, thereby releasing said plurality of articles from retained engagement therewith.

10. An article retrieval device as in claim 9 wherein:
said tube carrier and non-metallic tubes move in a vertical direction and;
said cable drive means comprises first and second idler pulleys positioned adjacent top and bottom ends of said support beam, a drive pulley, a servo motor coupled to said drive pulley, and a drive cable, one end of which is connected to a top end of said tube carrier and the other end of which is connected to a bottom end of said tube carrier, the drive cable being routed over said first and second idler pulleys and being wound around said drive pulley.

11. An article retrieval device as in claim 10 further comprising safety latch means positioned at the top of said support beam for retaining said pair of non-metallic tubes in said first stop position, in the event of a loss of operating power, to prevent inadvertent gravitational downward motion thereof; said controller means being operative for releasably controlling said safety latch means during normal operation of said article retrieval device.

12. An article retrieval device as in claim 9 wherein said non-metallic tubes are fabricated of a carbon fiber material.

13. An article retrieval device as in claim 9 wherein each one of said plurality of receivers is formed to be of the same shape as a projecting portion of a corresponding one of said plurality of formed articles.

14. An article retrieval device as in claim 9 wherein each one of said plurality of receivers is formed to be cup-like.

15. An article retrieval device as in claim 9 wherein each one of said plurality of receivers comprises a generally flat plate having a flange along a portion of a peripheral edge thereof.

16. An article retrieval device as in claim 9 wherein said vacuum control and differential vacuum sensing means comprises:
a vacuum transducer for sensing a current vacuum level drawn through said plurality of receivers;
vacuum sampling means for recording the current vacuum level sensed by said vacuum transducer at a plurality of predetermined intervals during a time wherein said non-metallic tubes are in said first stop position, for computing an average current vacuum level, and for computing current high and low vacuum setpoints, said vacuum sampling means being further operative for continuously monitoring said current vacuum level during a time window when said non-metallic tubes are in said second stop position; and
vacuum comparison means for comparing said current vacuum level, during the time window when said non-metallic tubes are in said second stop position, with said computer current high and low vacuum setpoints to determine whether said current vacuum level falls within said computed current high and low vacuum setpoints to thereby indicate that all of said plurality of formed articles are in suction engagement with said corresponding plurality of receivers, said controller means inhibiting said cable drive means to prevent movement of said non-metallic tubes from said second stop position to said first stop position when said current vacuum level is not within said computed current high and low vacuum setpoints.

17. An article retrieval device as in claim 9 wherein said controller means is further operative for clearing said mold close signal, thereby halting closure of said mold, in the event said pair of non-metallic tubes does not move from said second stop position to said first stop position within a predetermined period of time, thereby preventing damage to said non-metallic tubes by closure of said mold thereon.

* * * * *